(12) United States Patent
Afghah et al.

(10) Patent No.: US 10,644,892 B2
(45) Date of Patent: May 5, 2020

(54) AUTHENTICATION BASED ON A CHALLENGE AND RESPONSE USING A PHYSICALLY UNCLONABLE FUNCTION AND A MACHINE LEARNING ENGINE

(71) Applicant: Arizona Board of Regents on Behalf of Northern Arizona University, Flagstaff, AZ (US)

(72) Inventors: Fatemeh Afghah, Flagstaff, AZ (US); Bertrand Francis Cambou, Flagstaff, AZ (US)

(73) Assignee: ARIZONA BOARD OF REGENTS ON BEHALF OF NORTHERN ARIZONA UNIVERSITY, Flagstaff, AZ (US)

(*) Notice: Subject to any disclaimer, the term of this patent is extended or adjusted under 35 U.S.C. 154(b) by 0 days.

(21) Appl. No.: 16/416,038

(22) Filed: May 17, 2019

(65) Prior Publication Data

US 2019/0280885 A1    Sep. 12, 2019

Related U.S. Application Data

(62) Division of application No. 15/348,047, filed on Nov. 10, 2016.

(60) Provisional application No. 62/255,869, filed on Nov. 16, 2015.

(51) Int. Cl.
| H04L 29/06 | (2006.01) |
| H04L 9/32  | (2006.01) |
| G06F 21/60 | (2013.01) |
| G06N 20/00 | (2019.01) |
| G06F 21/73 | (2013.01) |
| H04L 9/08  | (2006.01) |
| G06N 5/02  | (2006.01) |
| G09C 1/00  | (2006.01) |

(52) U.S. Cl.
CPC .......... *H04L 9/3278* (2013.01); *G06F 21/602* (2013.01); *G06F 21/73* (2013.01); *G06N 5/02* (2013.01); *G06N 20/00* (2019.01); *G09C 1/00* (2013.01); *H04L 9/0866* (2013.01); *H04L 9/0894* (2013.01); *H04L 2209/34* (2013.01)

(58) Field of Classification Search
CPC . H04L 9/3278; H04L 9/0866; H04L 2209/34; G06N 20/00; G06F 21/602; G06F 21/73
See application file for complete search history.

(56) References Cited

U.S. PATENT DOCUMENTS

| 9,501,664 B1    | 11/2016 | Hamlet |
| 2014/0327468 A1 | 11/2014 | Pfeiffer et al. |
| 2015/0092939 A1 | 4/2015  | Gotze et al. |
| 2015/0192637 A1* | 7/2015 | Falk .................. G06F 21/55 326/16 |
| 2016/0110130 A1* | 4/2016 | Kan ................... G06F 21/79 711/163 |

FOREIGN PATENT DOCUMENTS

WO    2008015603 A1    2/2008

* cited by examiner

*Primary Examiner* — Hee K Song
(74) *Attorney, Agent, or Firm* — Quarles & Brady LLP

(57) ABSTRACT

The present disclosure relates to implementations of physically unclonable functions (PUFs) for cryptographic and authentication purposes. Specifically, the disclosure describes implementations of machine learning engines (MLEs) in conjunction with PUFs generating outputs having multiple states.

12 Claims, 10 Drawing Sheets

Fig.1: PUF Challenge / Response generation with Multi-states

Fig. 2: Challenge Generation – Block diagram

1- Responses – CRP Error Rate per state

Number of bits in the PUF: N

| Position in the PUF k | 1 | 2 | 3 | 4 | 5 | . | h | . | . | N |
|---|---|---|---|---|---|---|---|---|---|---|
| Responses Rk | 1 | 0 | 0 | 1 | 0 | . | 1 | . | . | 1 |
| Challenge Ck | 1 | 1 | 0 | 1 | 0 | . | 0 | . | . | 1 |
| $\Delta CRPk = Ck \oplus Rk$ | 0 | 1 | 0 | 0 | 0 | . | 1 | . | . | 0 |
| Multi-state i | 5 | 4 | 0 | 6 | 2 | . | 3 | . | . | 7 |

2- Average Error rate per state

Vector of Errors $VE = E_0, E_1, ..., E_i, ..., E_n$

For the multi-state i: $Ei = \frac{1}{n_i} \sum_{k=1}^{k=n_i} |Rk - Ck|$ ; $n_i$ is the number of cells in the state i

3- Example with n=7

| Multi-state i | 0 | 1 | 2 | 3 | 4 | 5 | 6 | 7 |
|---|---|---|---|---|---|---|---|---|
| Error Ei in % | 0 | .1 | 2 | 26 | 26 | 4 | .4 | 0 |

Fig.3: PUF Responses and CRPs Error rates

Fig. 4: Authentication – Block diagram

Fig.5: Authentication and Machine Learning

Fig.6: Error Correction and Machine Learning

Fig.7: Gray coding

AUTHENTICATION BASED ON A CHALLENGE AND RESPONSE USING A PHYSICALLY UNCLONABLE FUNCTION AND A MACHINE LEARNING ENGINE

CROSS-REFERENCE TO RELATED APPLICATIONS

This application is a divisional application of U.S. patent application Ser. No. 15/348,047 entitled "MULTI-STATE UNCLONABLE FUNCTIONS AND RELATED SYSTEM" and filed on Nov. 10, 2016, which claims the benefit of U.S. Patent Application No. 62/255,869 entitled "MULTI-STATE UNCLONABLE FUNCTIONS AND RELATED SYSTEM" and filed on Nov. 16, 2015.

FIELD OF THE INVENTION

The present disclosure relates to implementations of physically unclonable functions (PUFs) for cryptographic and authentication purposes. Specifically, the disclosure describes implementations of machine learning engines (MLEs) in conjunction with PUFs generating outputs having multiple states.

BACKGROUND OF THE INVENTION

A PUF is a physical device or function whose output depends upon the device's physical characteristics. The physical characteristics, such as critical dimensions, doping levels of semiconducting layers, and threshold voltages, make the devices unique and difficult to duplicate. PUF may therefore be utilized as a hardware implementation of a one-way function.

PUFs are strengthening the level of security of emerging data security methods. In such systems, PUFs operate as a set of cryptographic primitives useful in authentication procedures. The underlying mechanism of PUF authentication is the creation of a large number of challenge (i.e. Input) response (i.e. output) pairs (called CRPs) that are unique to each PUF device. Once deployed during an authentication cycles, the PUFs are queried with challenges. Authentication is granted when the rate of matching responses is statistically high enough.

In various authentications, the challenges are stored in a secure server coupled to the device being prepared for authentication. Once generated during the authentication cycles, the challenges are then used in challenge queries. Authentication is granted by the system when the rate of matching responses between the PUF-generated CRPs is sufficiently high enough above a threshold value. Weak PUFs generally only produce a satisfactory rate of responses far from 100% matching, while with strong PUFs the rate approaches 100%.

Over time, however, PUFs are subjected to a set of physical parameters, such as temperature, aging factors, bias voltage drifts, and electrostatic interferences that cause the output of a PUF to change over time. In conventional implementations, this varying output can result in an increased and undesirable error rate. A number of different error correction coding (ECC) techniques have been developed in an attempt to reduce intra-PUF output variations. These approaches, however, generally cannot overcome the relatively high data error rate in subsequent read-outs of PUF in the presence of environmental variations.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF PREFERRED EMBODIMENTS

The present disclosure relates to implementations of physically unclonable functions (PUFs) for cryptographic and authentication purposes. Specifically, the disclosure describes the implementations of machine learning engines (MLEs) in conjunction with multi-state PUFs.

In the present system and method, the outputs of a particular PUF device are sorted into a plurality of different states arranged to capture a profile of the physical parameters determining the operation of the PUF. Because the multiple states are tied to the PUF's physical characteristics, the multi-state output of the PUF enables a prediction of error rates for the PUF's output. For a particular PUF device these error rates stay constant, even when the PUF device is subjected to natural effects such as aging, temperature changes, bias voltages drifts, and electrostatic interferences. As such, a Machine Learning Engine (MLE) can analyze the current output of the PUF device in conjunction with the PUF's known and predictable error rates to account for variations in PUF output over time. Natural drifts of the PUF's output therefore do not result in errors such as negative authentication, while statistically abnormal challenges may still be caught and flagged as a strong negative authentication.

Figure 9:
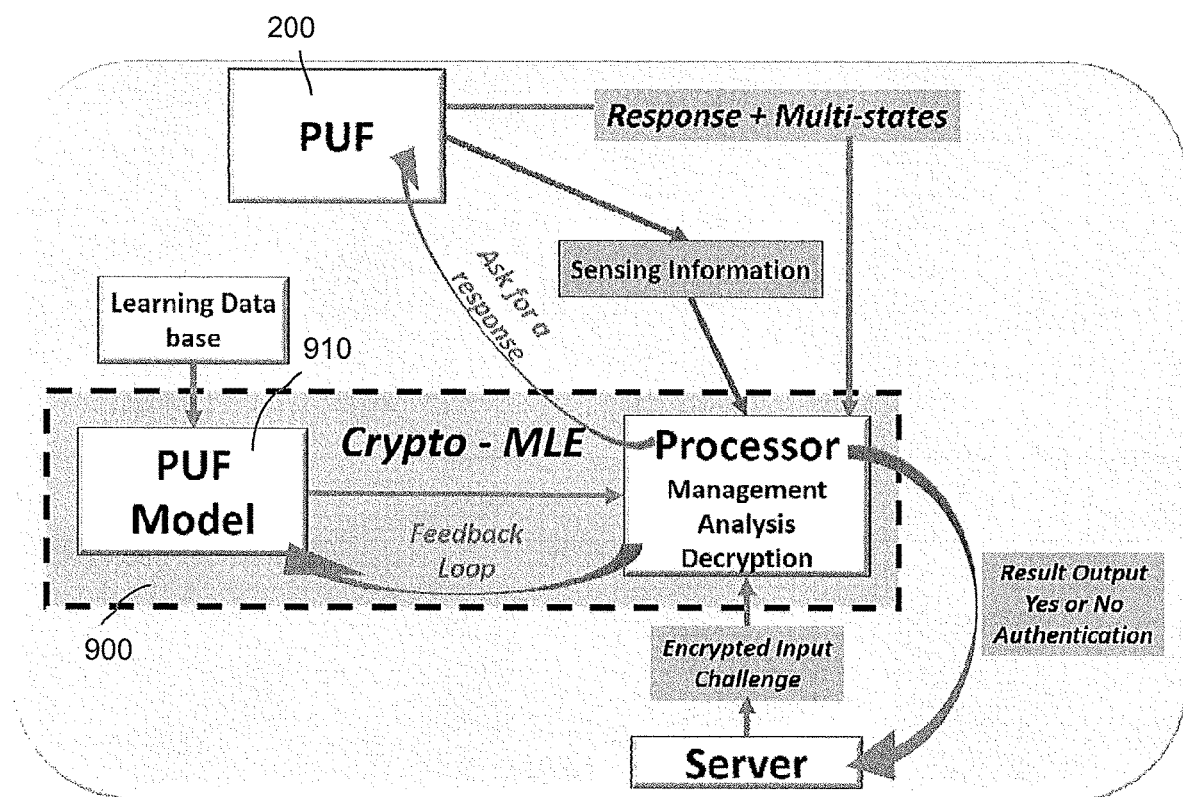
FIG. 9 is a block diagram illustrating implementations of authentication systems that utilize PUFs in combination with a crypto-machine learning engine.

FIG. 9 illustrates one implementation of an authentication system that utilizes PUFs. A server initially queries the system with a challenge. After receiving the initial challenge, a response is generated by the PUF 200. This response, as well as a mapping of the multi-states and sensing of the parameters surrounding the PUF 200 (e.g., temperature, age, and the like) are returned to a crypto MLE 900. The Crypto-MLE 900 process the response received from the PUF 200 as well as the multi-state data and sensing information using PUF models 910, and a learning data base to produce an output to the server. The output generated by the Crypto-MLE 900 indicates a positive or negative authentication.

In the present system and method, a machine learning engine 220 (MLE) is configured to analyze the output of a multi-state PUF 200 based on a challenge or response generation process that captures unique attributes of the physical elements underling the PUFs in a multi-state memory 210. The MLE 220 then implements an authentication process that quantifies the profile of the PUF's CRP error rates in addition to the surrounding input and environmental parameters (such as ambient temperature and age of the PUF 200). A computation is then performed by the MLE 220 to finalize the authentication process. In the present disclosure various examples are presented in which PUF challenge and responses have a size N of 128 bits. But it will be understood that the present system and method may be utilized in accordance with PUFs having different challenge and response sizes and different configurations.

A PUF 200 may be implemented as an array of memory cells. Each cell in the memory array may be implemented, for example, as a resistive random access memory (ReRAM) element, whose conductivity is determined by a voltage supplied to the memory cell, though other configurations may be used as well. Using such a memory array, a challenge may be created by sweeping the voltage supplied to each memory cell in the array to determine at what input voltage the cell's conductivity changes and the cell switches from storing a logical value of "0" to a logical value of "1". This voltage is referred to as Vset for that memory cell. Due to the physical attributes of the memory array, different cells will switch logical values at slighting different Vset voltages. Those varying Vset voltages can be used to create a challenge for a particular PUF 200 device. For example, a challenge may be created by allocating a particular cell in the array a value of "0" if the Vset voltage at which it changes state falls below a threshold value. Conversely, a particular cell may be allocated a value of "1" if the Vset voltage at which it changes state is equal to or greater than the threshold value. The challenge is then a stream of bits whose values are determined by the Vset values allocated to each cell in the memory array.

Once extracted from the memory array, the challenge may be sent to and stored within a secure server 230. Concurrently, as shown FIG. 1, the various cells in the memory are sorted into different groups based upon the Vset value at which the cells switched from a logical value of "0" to a logical value of "1". Because that particular Vset value is at least partially determined by the physical parameters of the cells, this involves grouping the cells based upon the physical parameters underlining each cell of the memory.

Figure 1:
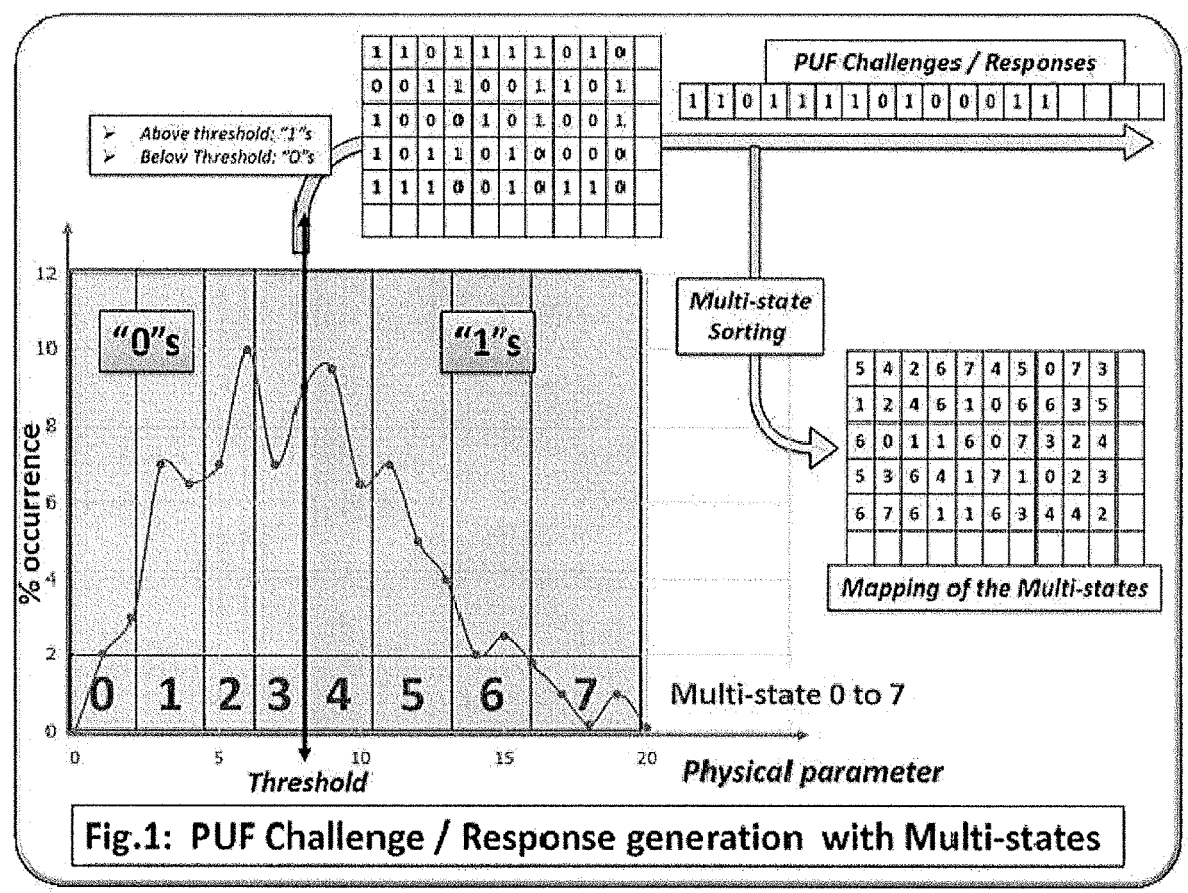
FIG. 1 is a diagram illustrating the generation of multi-state outputs from a PUF device.

In the example depicted in FIG. 1, the 16 memory cells of the total 128 cells with the lowest Vset values are allocated to a group with state 0, the following 16 cells with higher Vset values are allocated state 1, all the way to the 16 cells with the highest Vset value that are allocated state 7. In this manner, the cells of the memory are sorted in 8 different states.

Because the Vset value for a particular cell is determined at least partially by the physical attributes of the cell, the cells that are each grouped together within the same group will tend to share some physical attributes. The groupings, therefore, provide useful knowledge about the cells themselves and, as described in detail below, provides some information regarding the likelihood of the various cells to change state given a particular set of environmental conditions.

The precise mapping of the PUF 200 memory array (e.g., the PUF's challenge bit stream as well as the groupings of cells within the PUF 200) can be stored in a secure memory during the challenge generation process, this configuration is referred to below as Option A. An alternative method of equivalent efficiency is to extract the mapping during the response generation process, this configuration is referred as Option B.

Figure 2:
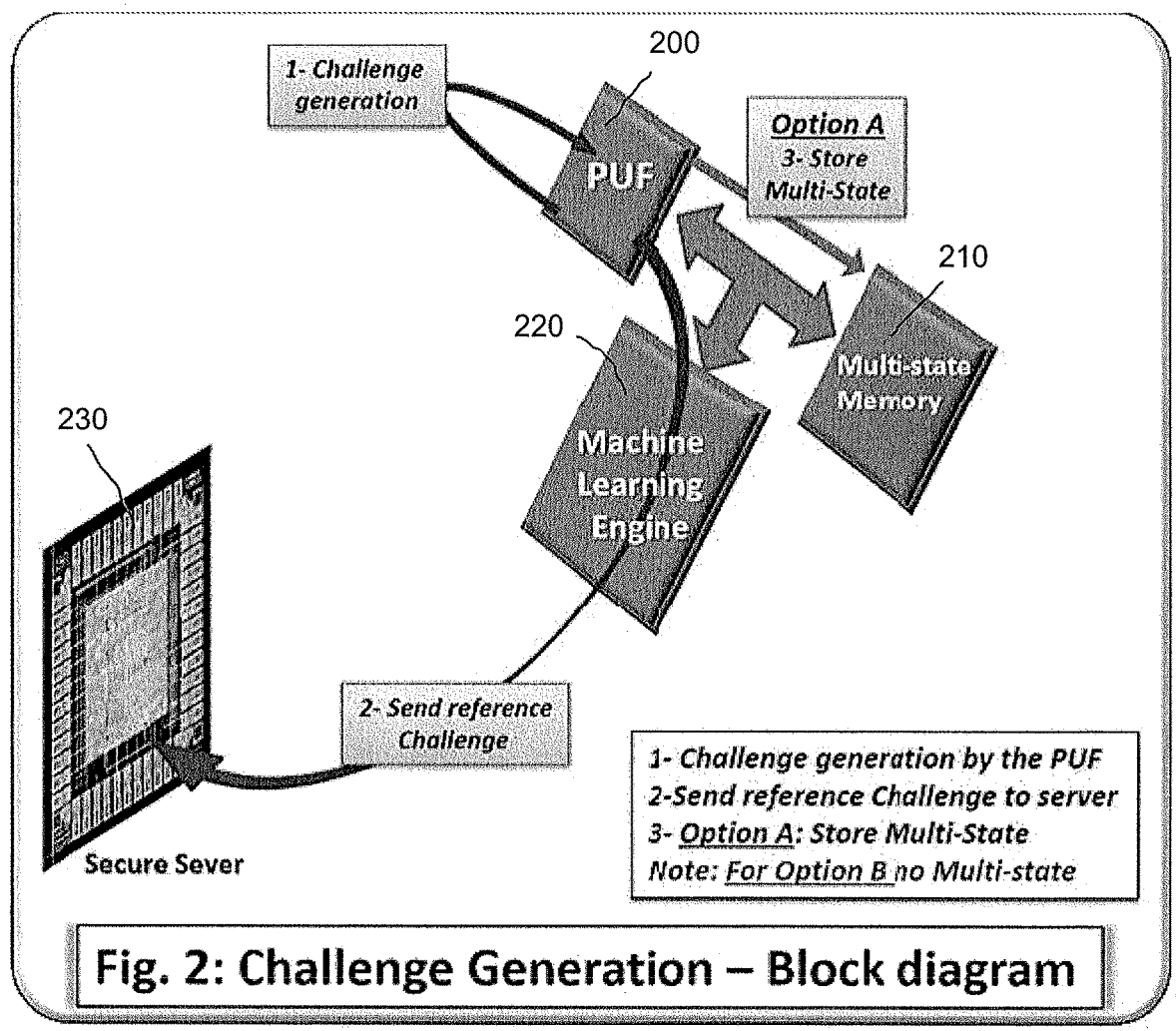
FIG. 2 is a block diagram illustrating a method for challenge generation using a PUF device.

To reiterate more generally, a PUF 200 of N bits is sorted into n states, either during challenge generation, or response generation. Each state i is allocated to ni cells in such a way that $\Sigma_{ni=1}^{ni=n} ni=N$. The overall block diagram showing how the challenge generation process is done is shown FIG. 2 through an MLE 220 that manages the entire secure PUF system.

With an initial challenge generated for the PUF 200 and stored in secure memory, the PUF 200 may be utilized to generate responses as part of a CRP. As described above, over time the output of the PUF 200 may vary due to environmental factors, resulting in an error or variance in the output of the PUF 200.

Figure 3:
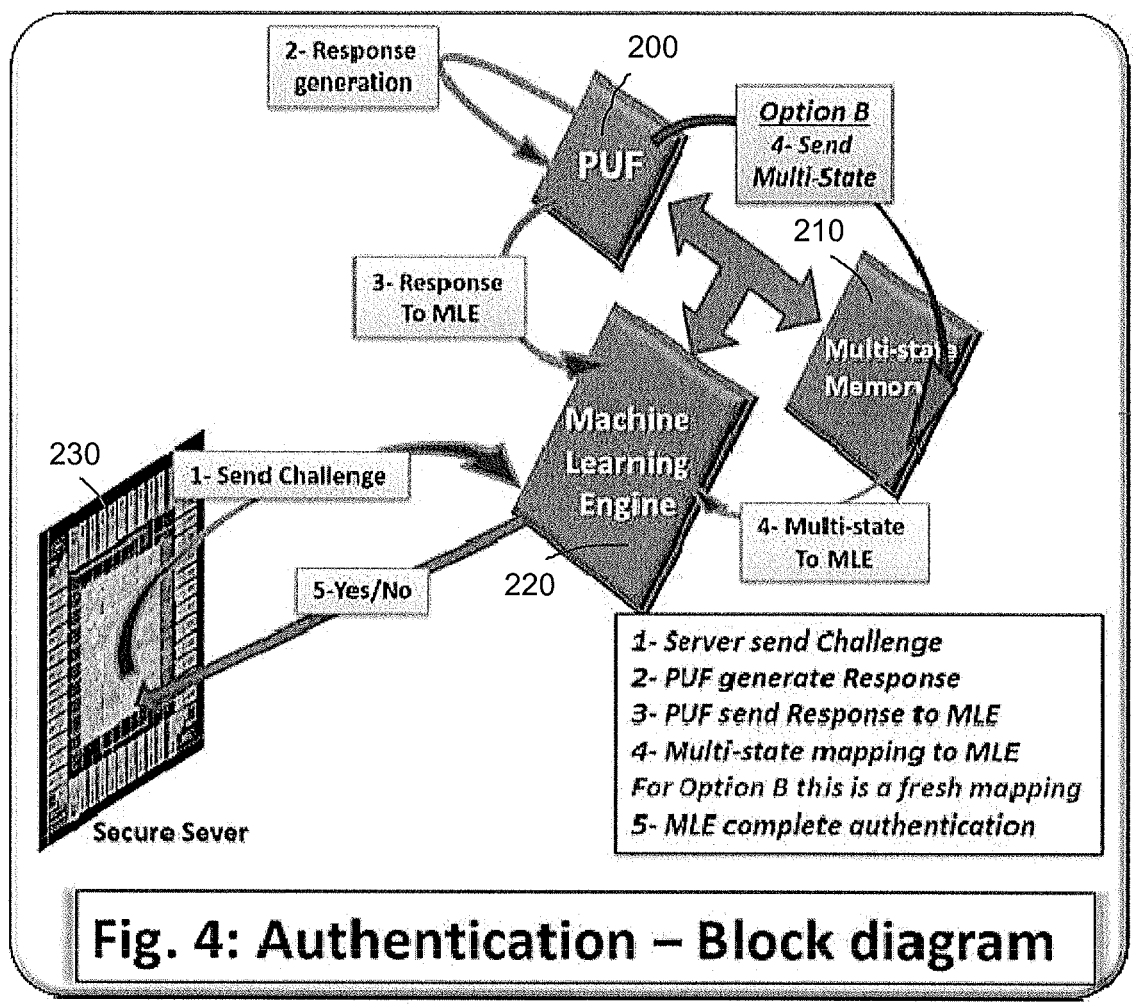
FIG. 3 is a table illustrating an error rate and vector of errors for a RCP for a PUF device in which the CRP error rates, Ei, may be derived from analysis of experiments performed on ReRAM devices.

The PUF 200 responses may be generated in the same manner as the challenges, described above. The responses are typically created in response to a new request for authentication or the initiation of a cryptographic function. As shown FIG. 3, differences or errors in the CRPs are expected considering that the physical parameters of the PUFs are naturally evolving over time and so the output of the PUF 200 changes over time. For example, temperature changes over time may increase the likelihood of CRP errors.

For a given cell k that is part of the PUF 200, the CRP error between the challenge Ck and the response Rk is given by the equation:

$$\Delta CRPk = |Rk - Ck|$$

Where ΔCRPk is the CRP error rate of the cell k. For the populations of ni cells that are part of the state i the average CRP error rate is given by:

$$Ei = \frac{1}{n_i} \sum_{k=1}^{k=n_i} |Rk - Ck|$$

The average error rate for the n states is given by a Vector of Error VE that is characteristic of a particular response:

$$VE = E_0, E_1, \ldots, E_i, \ldots, E_n$$

This description of CRP error rates, and the resulting Vector of error is applicable to both Option A and Option B described above. In the case of Option A, the grouping of memory cells by state is done during the challenge generation process while it is also done during the response generation process for Option B. As shown below these Vectors of Errors are used to complete the authentication process.

When utilizing the present multi-state PUF 200 implementation, the majority of errors (that is, difference between the bits of the challenge and response values) are likely to occur for memory cells sorted into the groups around the threshold Vset value. With reference to table 3 of FIG. 3, for example, groups 3 and 4 (shown in FIG. 1 to be the groups directly on either side of the threshold Vset voltage) exhibit a significantly higher likelihood for errors that cells belonging in the other groups. This results because those cells may only require small changes in environmental conditions to change the Vset value at which they change state. The other cells (e.g., those cells that are members of groups 0, 1, 2, 5, 6, and 7) would require more significant variances in environmental conditions to change their behavior and so are less likely to result in changes and, therefore, errors.

The vector of error described above, therefore, may be supplied to an MLE 220 which can use the vector of error to identify which values in a CRP have been generated by reliable memory cells (e.g., those cells belonging to groups 0, 1, 2, 5, 6, and 7) and which values were generated by unreliable memory cells (e.g., those cells belonging to groups 3 and 4). Differences in the CRP occurring in unreliable memory cells may therefore be given less weight and made less likely to result in a mismatch or error condition than more reliable cells.

Figure 4:
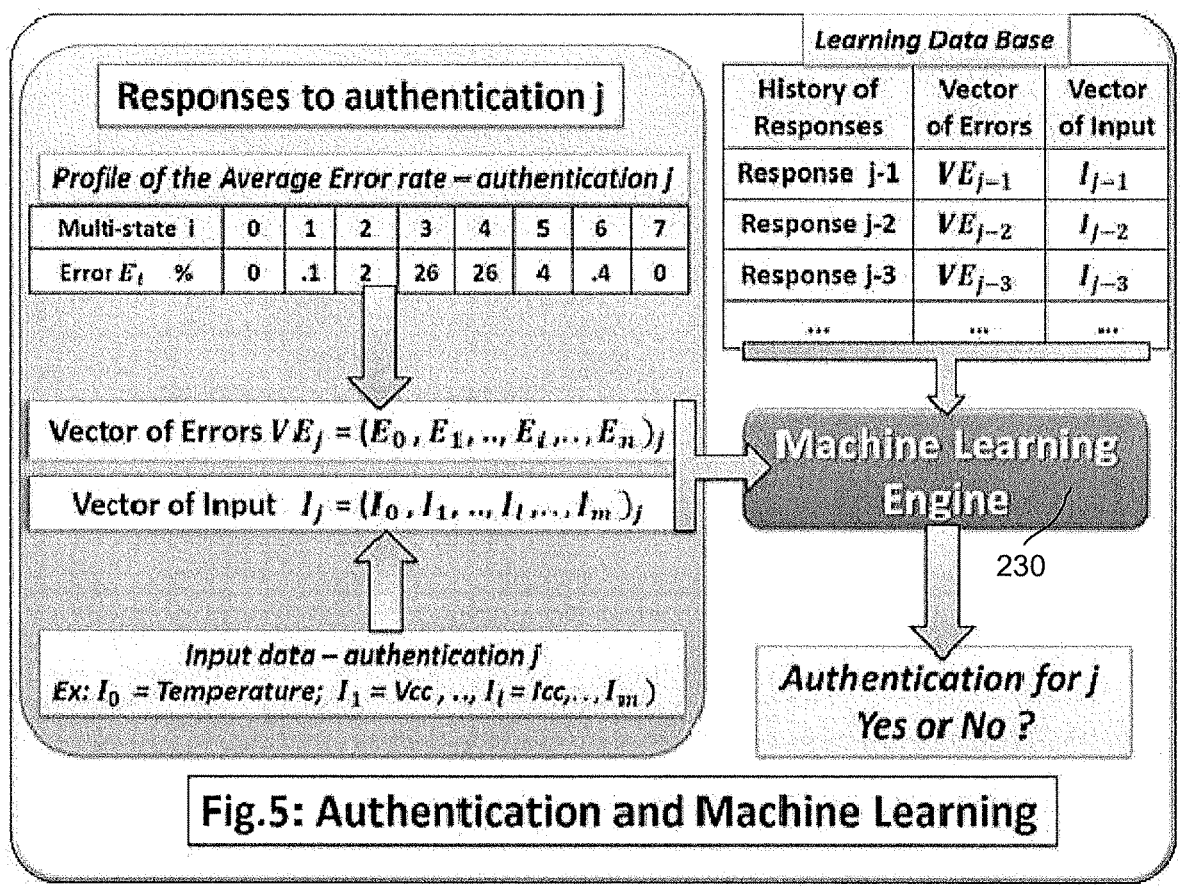
FIG. 4 is a block diagram illustrating a method for authentication in accordance with the present disclosure.

FIG. 4 illustrates an authentication scheme implemented by an MLE 220 in conjunction with the present multi-state PUF 200. In step 1, a secure server 230 sends a challenge to the MLE 220. The MLE 220 requests that the PUF 200 generate a fresh response in step 2. In step 3, the MLE 220 gathers the response from the PUF 200, as well as all available data to compute a secure authentication.

Then, in the case of Option A, in step 4 the MLE 220 retrieves the mapping of the multi-states of the PUF 200 from the secure memory, while in the case of option B in optional step 4 a fresh mapping of the multi-states is generated during the response generation process. The MLE 220 handles the communication between the secure server 230 and the PUF 200, and can be integrated in a secure element containing a crypto-processor, the secure memory, and the PUF 200.

Figure 5:
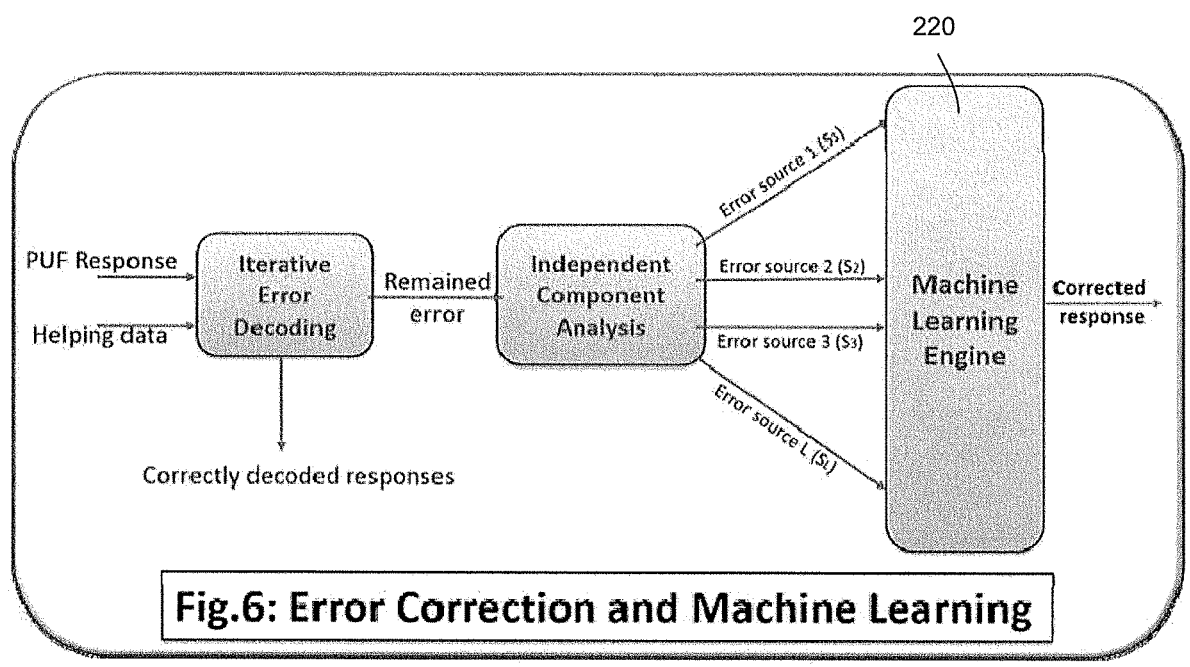
FIG. 5 is an illustrating an approach for implementing CRP evaluation using an MLE.

The MLE 220 can then evaluate the response received from the PUF 200 to determine whether any differences between the response and the challenge received in step 1 may be attribute to natural drifts in the PUF's operation over time (e.g., that are attributable to environmental changes) or whether the differences are attribute to suspicious causes (e.g., a malformed or false challenge). In performing the evaluation, the MLE 220 may rely upon the vector of error, described above, environmental conditions of the PUF 200, historical values for prior PUF responses, and other information describing how the PUF responses may vary according to different ambient conditions. FIG. 5, for example, illustrates the data inputs supplied to the MLE 220 in performing the present authentication analysis. In one implementation, the MLE 220 may be configured to examine the CRP using the following information:

A Vector of Error: $VE_j=(E_0, E_1, \ldots, E_i, \ldots, E_n)_j$ for the PUF 200.

A Vector of Input: $I=(I_0, I_1, \ldots, I_i, \ldots, I_m)_j$ that describes all parameters that could be available to the MLE 220 describing the current operating conditions of the PUF 200 including operating temperature, biasing voltage and current conditions, as well as the level of electromagnetic noise.

A Learning data base that incorporates a record of prior responses from the PUF 200.

Generic predictive models describing the laws of physics underlining the physical parameters of the PUF 200. For example the impact of temperature on the physical parameter is usually well described by predictive models.

In step 5, having evaluated the CRP in view of the available vector of error and environmental data, the MLE 220 determines whether the CRP is valid and issues a response to the secure server 230 accordingly.

A design criteria for implementing the algorithms by which the present MLE 220 evaluates CRPs for a particular PUF 200 includes achieving relatively high inter-PUF device and low intra-PUF device Hamming distances. The inter-device distance is measured as the average Hamming distance between the responses of two PUF devices to the same challenge that shows the uniqueness of PUF responses. However, the intra-device distance measures the average Hamming distance between the responses from a PUF 200 to the same challenge applied at different times and environmental situations. A larger Hamming distance results in lower probability that a noisy readout of a particular PUF 200 will be mapped to another identity in database (lower false acceptance rate). One method to reduce the false acceptance rate and false rejection rate is increasing the length of output bits in the CRP.

The changes in environmental conditions and also an aging factor can result in minor mismatches in circuit components, hence the PUF responses to the same challenge can be affected by noise. These potential variations may occur due to random noise at terminal signals such as source, drain and gate or changes in temperature or voltage or aging effects (deterministic noise). The natural and physical causes behind the deterministic portions of noise suggests the possibility of learning this behavior over the course of different response generations by a PUF 200 and the use of this as a-priori information in error detection and correction for later response generations. Use of additional error correction modules may also combat the effects of random noise within the present authentication system.

Figure 6:
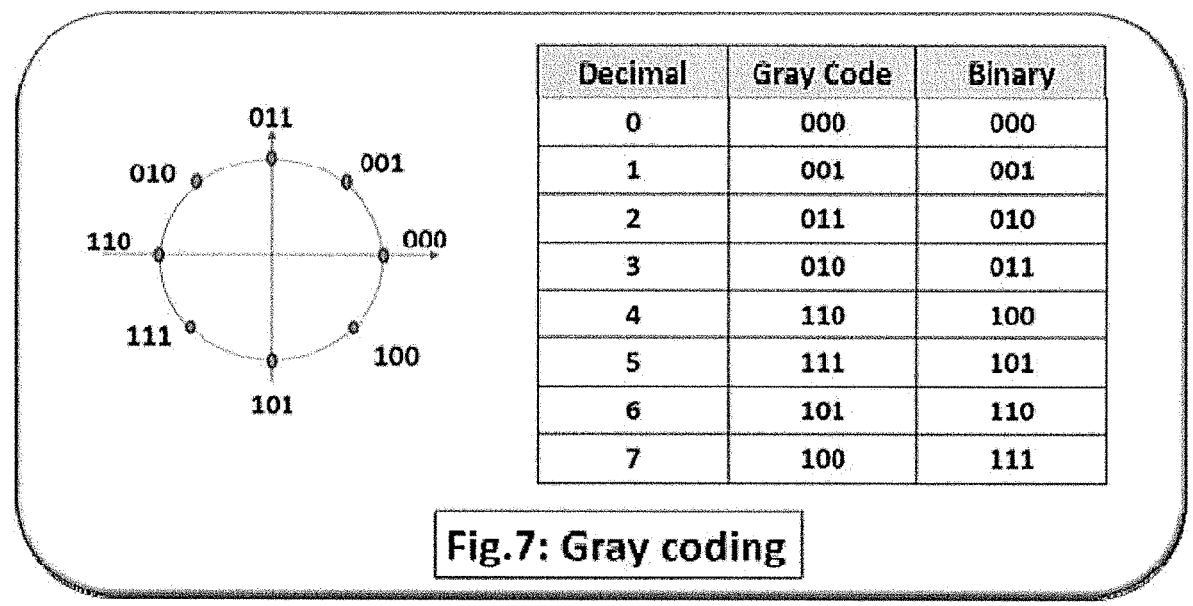
FIG. 6 is a block diagram illustrating an error correction implementation incorporating an MLE in accordance with the present disclosure.

In one embodiment, error correction codes and machine learning algorithms are combined to combat both random and predictable potential noise sources in a PUF 200. FIG. 6 is a block diagram illustrating how this approach may be based on a multi-level iterative decoding method to improve the performance of error correction through utilization of intrinsic reliability information in data. The approach also utilizes iterative decoding between two decoder modules (see FIG. 8B) in which the soft output of each decoder is fed as a-priori information to the other module to improve its decoding accuracy till converging to a desired performance. This design may considerably reduce the error probability.

Since a portion of PUF 200 error may be due to physical and environmental factors, these types of errors can be learned and predicted using information available from experiments on different PUFs. This form of error prediction—based upon historical rates of error in real-world PUF devices—may be utilized to correct errors resulting even after ECC has been implemented. Since these errors could have been caused due to several factors such as the variations in temperature, voltage and current, an Independent Component Analysis (ICA) technique (see FIG. 6) may be used to break down this error to a summation of known possible causes. Independent component analysis involves the decomposition of a random vector in linear components that are non-Gaussian and independent or as independent as possible. When implementing ICA, the assumption of independency among the variables can be relaxed to address the possibility of correlation among the physical and environmental factors that may cause variations in PUF 200 readouts or outputs. Then each of the error terms may be corrected using machine learning algorithms knowing the available data sets that are associated with variations due to each of these parameters.

In some instances, when performing error correction, the multi-state CRP generation method described above and illustrated in FIG. 1 may be utilized within a multi-level soft decision correction method based on iterative decoding. In such an approach, the PUF 200 readouts are first quantized to 8 different levels (though in other embodiments different quantizations of PUF 200 readouts may be utilized) that enable a measurement of readout reliability. Quantizing the PUF 200 readouts into discrete groups enables, as discussed above, a measurement of error probability. A Euclidean distance between CRPs is generated by comparing the response from the PUF 200 to a given reference vector from the challenge. This model, in which PUF 200 readouts are assigned to different groups, is therefore able to further distinguish the accuracy and reliability of the readouts from the PUF 200 in comparison to a binary model since the model provides more information regarding the distance of the readouts from the Vset threshold.

Figure 7:
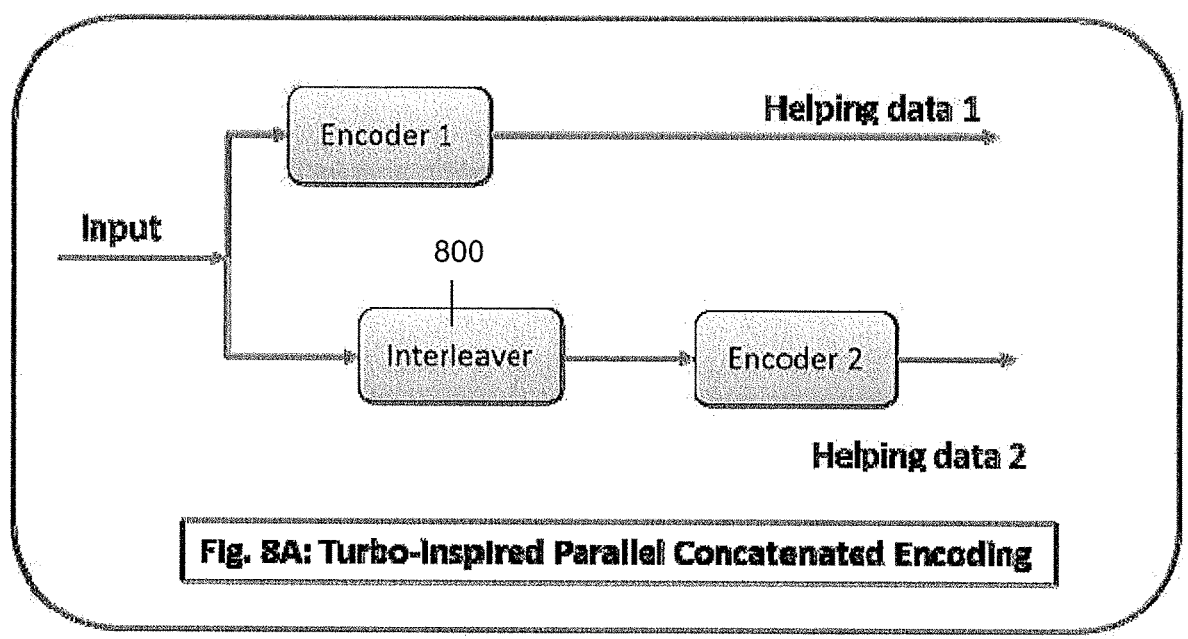
FIG. 7 is a diagram illustrating a Gray encoding scheme.

When processing the challenge, the states associated with each readout value from the PUF 200 can be mapped to a binary notation using a Gray coding method. FIG. 7 is an illustration comparing a Gray encoding method to a conventional binary encoding method for decimal values ranging from 0 to 7. Each bit of the challenge string may be encoded using two independent Binary Bose-Chaudhuri-Hochquenghen (BCH) coding modules based on code-offset techniques and corresponding redundant or helping data that has been added to the input signal. The challenge string is then encrypted using a hash function and made available as public information. When processing the responses, the PUF 200 readouts in the response to the challenge are passed through a similar process of quantization and Gray coding and the extracted information is combined with the publicly available helping data. The difference between the codewords extracted from the challenge and response is transformed to soft information and is fed to the iterative parallel concatenation decoding structure.

The present coding structure is based on multi-state input and an iterative parallel concatenated decoding using soft decision decoding. In hard decision decoding, the output is made up of a set of specific values (in the case of binary values, 0 and 1), however in soft decision decoding the output instead presents the reliability of each bit, e.g. how close the reading is to the thresholds for 0 or 1, instead of saving the results in binary as a hard decision. Therefore, the present method can improve PUF 200 data estimation accuracy by using the intrinsic reliability information in a concatenated structure. Furthermore, this method can eliminate the need for having a large initial data string to obtain a required accuracy.

In the present embodiment, each readout (Ri) from the PUF 200 is quantized to a state value from the finite set of (s1, s2, s3, . . . , sQ), where $Q=2^M$, where Q and M denote the number of non-overlapping states and the number of bits, respectively. The quantization can be performed using common uniform midrise quantization methods, for example. Since the PUF 200 readouts may follow a Gaussian distribution, it could be possible to use a Lloyd-Max quantizer as an optimum design for Gaussian distributed input.

In one embodiment, Gray coding is used to map the state information to binary data to be transmitted between the server and PUF 200. In a Gray coding scheme, adjacent states only differ in one bit. The Gray coding implementation for the case of 8 states is depicted in FIG. 7. The use of the Gray coding scheme can result in enhanced error resiliency of the proposed method.

In some embodiments, the present system may utilize turbo-inspired forward error correction codes. Turbo codes describe a class of high-performance ECCs utilized in various forms of electronic communications. Two features of turbo codes are i) the use of a pseudorandom interleaver 800 between the two coding components, and ii) an iterative decoding structure with a soft-input soft-output (SISO) decoder. The interleaver 800 distributes potential error in a dataword over different datawords and consequently increases the probability of error correction. In an iterative decoding design, the soft input of one decoder is fed to the other decoder and vice versa, until the final decoding results converge with a desired accuracy. The turbo codes are most commonly built up as a parallel concatenation of two Recursive Systematic Convolutional (RSC) codes. However, these will have an efficient performance for a long data string that may not be the case in some PUF 200 applications. Also for long input lengths, the computational complexity of the decoding process may become intractable.

Accordingly, an embodiment of this disclosure may use linear block codes with a turbo-inspired parallel concatenated coding structure and iterative decoding nature to obtain the benefits of accurate error correction with an acceptable data string length. Different coding components such as BCH and Reed Solomon (RS) can optionally be utilized in this model.

Figure 8:
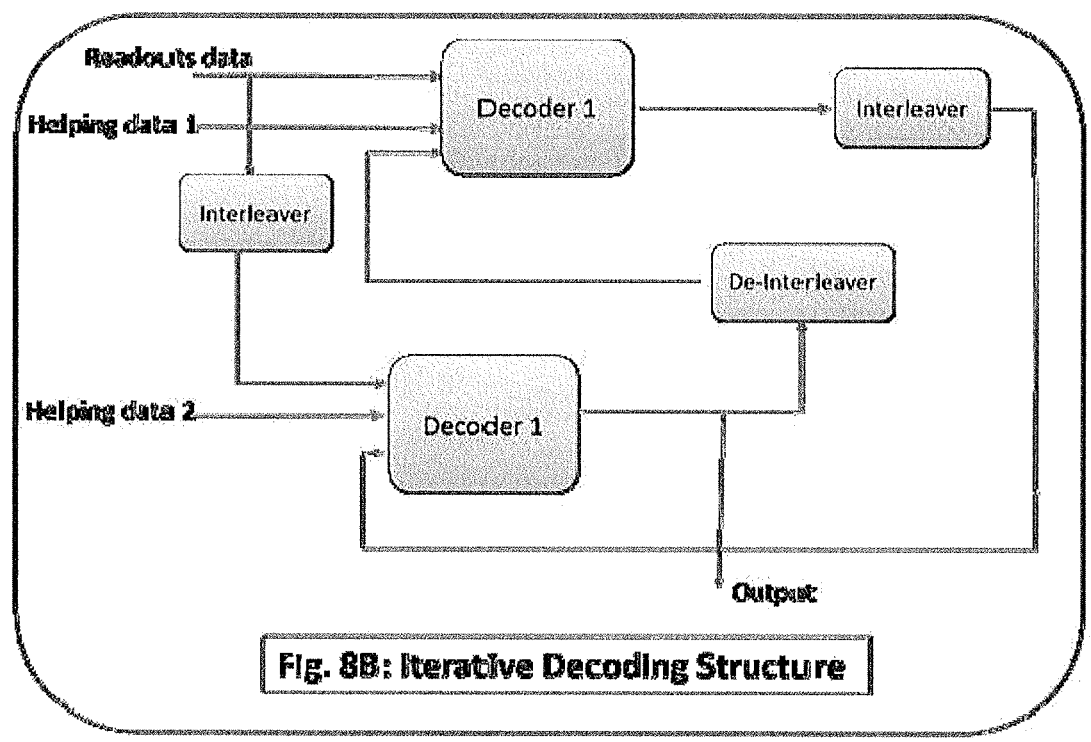
FIGS. 8A-8B are block diagrams illustrating techniques for error correction in accordance with the present disclosure.

Coding can be performed through a multi-stage parallel coding structure. For simplicity, FIG. 8A illustrates a turbo-inspired parallel concatenated encoding scheme in which a random interleaver 800 is disposed between encoding modules.

The random interleaver 800 is utilized between the two parallel coding components to distribute the possible error over the codeword and produce a random-like property. This enables the shuffling of PUF 200 outputs while keeping the linear behavior of the PUF 200. Different interleaver designs have been used in communication systems including random interleaver, convolutional interleavers, random interleaver and S-random interleaver and may each be utilized in accordance with the present disclosure. In one specific embodiment, a random interleaver is utilized, in which the order for random shuffling is securely saved in PUF 200 to perform de-interleaving and generate a response.

The coding structure may be designed using code-offset techniques as described below. In the challenge generation phase, PUF 200 readouts are quantized to 8 states and converted to a binary format using Gray encoding methods to generate a bit string $w \in \{0, 1\}^n$. Two codewords $c_1$ and $c_2$ that are randomly selected from a linear block code set $c_{n,k}$ with minimum distance d are added to w. The offset data between w and $c_1$ and $c_2$ is called helper data ($h_1=w+c_1$, $h_1=w+c_2$)) and is publicly available. In the response generation phase, a fuzzy version $w' \in \{0, 1\}^n$ is generated by the PUF 200 device, from which $c'_1$ and $c'_2$ are calculated as $c'_1=w'+h_1$, $c'_2=w'+h_2$. The distance between $c'_1$ and $c'_2$ with c is used to calculate the reliability information (soft-information). To further enhance security, the helper data can be encrypted using a Hash function or by the addition of redundant information.

In each decoding round, the extracted soft information can be used as an input for a consecutive soft-decision module, hence the PUF key may be determined with a shortened string. The criteria to determine the original codeword associated with current observation from the response includes selecting the codeword with minimum Euclidean distance. The reliability of the decoded bits is given by the log likelihood ratio (LLR) of the decision.

A Chase-Pyndiah algorithm can be utilized for an iterative decoder to minimize the probability of error. In this approach, each decoder component receives soft input LLR information as a logarithm of likelihood ratio (an estimate expressing the probability that the transmitted data bit was equal to zero or one). Both decoder components provide estimates of the same set of data bits in a different order. This information exchange process is continued in an iterative manner until converging with a desired accuracy. At each round, decoders re-evaluate their estimates, using information from the other decoder. The final output of the system can be extracted in soft format as the likelihood of each binary bit or as the difference between the original noisy input and the final extracted info, as illustrated in FIG. 8B.

PUFs represent strong cryptographic primitives because a fresh response is generated by the PUF hardware as often as needed to offer a secure, trusted authentication. Alterations to the PUF 200 due to foreign intervention, or attempts to present a fake challenge can be flagged by a negative authentication. The approaches described herein are configured to enhance the strength of PUFs by reducing the negative influence of natural drifts and variations of the physical parameters underlining the PUF 200. Other important factors in judging the strength of PUFs are their unclonability, and their ability to block foreign entity access to secret information, such as the PUF challenge or the mapping of the PUF's multiple states. PUFs are more or less unclonable as a function of their underlining parameters, and the integration of the PUF 200 within a secure element is an enhancing factor.

There are several approaches to improving security when multi-state architecture is involved. These include storing the mapping of the multi-state during challenge generation within an embedded secure memory (e.g., option A described above). With this option, the mapping is only generated once, together with the challenges. However correctly securing the secrecy of the storage is pivotal to the value of the method.

In some cases, a fresh mapping of the multi-states may be created during response generation, and downloaded to the MLE 220 (e.g., option B described above). In this case no data is stored, and after authentication there is no information left to be stolen by third party.

Finally, in some implementations, the mapping of the PUF's multiple states may be sent directly to the secure sever together with the challenges. Assuming that all data transferred between the PUF 200 and the secure server 230 is encrypted, this method may also be secure.

All three methods take advantage of the architecture presented in this disclosure.

In various embodiments, the present system and method provides for the use of a multi-state memory 210 with n states to store the respective position of PUF challenges of N bits sorted to reflect the profile of the physical parameters underlining the PUF 200. When the physical parameter varies from a low value to a high value, several bits ranked at the bottom of the distribution are given state 0. The following collection of bits is given the state 1. This sorting process will end with the last batch of these N bits, at the top of the distribution which are given the state n. The mapping of the respective position of the PUF response of N bits along the n states may reflect the physical parameters underlining the PUF 200. This mapping may be performed during the PUF response generation cycle, and transferred to a secure computational engine. The mapping of the respective position of the PUF responses of N bits that are reflecting the physical parameters underlining the PUF 200 may be performed during the PUF challenge process and communicated to an external secure processor.

The sorting of the N bits of the PUF challenge into n states may allow for the usage of error detection computation methods between the challenge, and the N bits of PUF responses that are tracking the profile of the physical parameters underlining the PUF 200. In some implementations, the error detection can be exploited be a computational engine to complete the authentication process that has the purpose to validate or invalidate that the challenge is satisfactory or not. The computational engine may be a secure processor, a machine learning engine 220, a state machine, or any engine powerful enough to perform the secure authentication.

In some implementations, sensing elements are added to capture the parameters surrounding the PUF 200 and transfer them in the computational engine to improve the accuracy of the secure authentication. These parameters include, but are not limited to, temperature, biasing conditions i.e. voltage and current, electro-magnetic interferences, acceleration, rotation, earth magnetic field, and mechanical stress.

In some implementations, authentication may be rendered more accurate through the use of a coding structure based on block turbo codes and iterative parallel decoding with soft decision making. The soft decoding may provide information on the reliability of each bit. The coding structure may utilize any of Max-Lloyd quantization to improve the accuracy of the secure authentication, Gray coding to improve the accuracy of the secure authentication, code-offset technique to improve the coding structure, and Inter-leaver methods to shuffle the bits and improve the coding structure. In some cases, hash functions, or parity bits are added to any of the data streams involved in the present system and method. Data streams may include, but are not limited to, challenges, responses, vectors of data and errors, and learning data bases.

In some implementations, machine learning techniques are used to predict and correct the portion of error in a CRP due to physical and environmental changes that were not captured by ECC. Independent component analysis techniques may be used to break down remaining error as a summation of multiple known error sources. The identified error from any of the physical and environmental factors may be compared to available datasets to be predicted using a machine learning technique as described herein. In some cases, the data streams are encrypted, or partially encrypted, and then decrypted. Here, the term data streams may refer to, but is not limited to, challenges, responses, mapping of multi-states, vectors of data and errors, vectors of input, and learning data bases.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method of authentication, comprising the steps of:
   receiving by a machine learning engine a challenge from a secure server, wherein the challenge comprises a first plurality of states;
   generating by a physically unclonable function (PUF) a response, wherein the response comprises a second plurality of states;
   generating outputs from the PUF comprising physical parameters that determine the operation of the PUF, wherein each output is a measurement of a cell in a plurality of cells in the PUF;
   creating a multi-state output of the PUF by sorting the outputs from the PUF into a plurality of different states arranged to capture a profile of the physical parameters of the PUF;
   communicating the response and the multi-state output from the PUF to the machine learning engine; and
   processing by the machine learning engine the challenge, the response and the multi-state output of the PUF to generate a positive authentication or a negative authentication.

2. The method of claim 1, wherein the multi-state output of the PUF was created and stored in a multi-state memory when the challenge was generated.

3. The method of claim 1, wherein the multi-state output of the PUF was created when the response was generated.

4. The method of claim 1, wherein each output, in the generating outputs from the PUF, is a measurement of a cell in the PUF comprises the steps of:
   sweeping an input voltage to each cell in the plurality of cells in the PUF;
   using the sensing element to measure the input voltage for each cell in the plurality of cells in the PUF when each cell switches from storing a logical value of "0" to a logical value of "1;" and
   quantizing and mapping the input voltage for each cell in the plurality of cells in the PUF to create a multi-state output from the PUF.

5. The method of claim 1, further comprising the steps of:
   sensing a first parameter of a surroundings of the PUF when the challenge was generated;
   sensing a second parameter of the surroundings of the PUF when the response was generated; and
   processing by a processor the challenge, the response, the multi-state output of the PUF, the first parameter of the surroundings of the PUF when the challenge was generated and the second parameter of the surroundings of the PUF when the response was generated to generate the positive authentication.

6. The method of claim 5, wherein the first parameter is a first temperature measurement of the surroundings of the PUF when the challenge was generated and the second parameter is a second temperature measurement of the surroundings of the PUF when the response was generated.

7. A system of authentication, comprising: a machine learning engine comprising a processor and a physically unclonable function (PUF) comprising an array of memory cells, wherein the machine learning engine and the PUF are configured to:
   receive by the machine learning engine a challenge from a secure server, wherein the challenge comprises a first plurality of states;
   generate by the PUF a response, wherein the response comprises a second plurality of states;
   generate outputs from the PUF comprising physical parameters that determine the operation of the PUF, wherein each output is a measurement of a cell in a plurality of cells in the PUF;
   create a multi-state output of the PUF by sorting the outputs from the PUF into a plurality of different states arranged to capture a profile of the physical parameters of the PUF;
   communicate the response and the multi-state output from the PUF to the machine learning engine; and
   process by the machine learning engine the challenge, the response and the multi-state output of the PUF to generate a positive authentication or a negative authentication.

8. The system of claim 7, wherein the multi-state output of the PUF was created and stored in a multi-state memory when the challenge was generated.

9. The system of claim 7, wherein the multi-state output of the PUF was created when the response was generated.

10. The system of claim 7, wherein each output, in the generate outputs from the PUF, is a measurement of a cell in the PUF, wherein the machine learning engine and the PUF are further configured to:
    sweep an input voltage to each cell in the plurality of cells in the PUF;
    use the sensing element to measure the input voltage for each cell in the plurality of cells in the PUF when each cell switches from storing a logical value of "0" to a logical value of "1;" and
    quantize and map the input voltage for each cell in the plurality of cells in the PUF to create a multi-state output from the PUF.

11. The system of claim 7, wherein the machine learning engine and the PUF are further configured to:
    sense a first parameter of a surroundings of the PUF when the challenge was generated;
    sense a second parameter of the surroundings of the PUF when the response was generated; and
    process by a processor the challenge, the response, the multi-state output of the PUF, the first parameter of the surroundings of the PUF when the challenge was generated and the second parameter of the surroundings of the PUF when the response was generated to generate the positive authentication.

12. The system of claim 11, wherein the first parameter is a first temperature measurement of the surroundings of the PUF when the challenge was generated and the second parameter is a second temperature measurement of the surroundings of the PUF when the response was generated.

* * * * *